(No Model.)
S. T. NEWMAN.
LATHE CHUCK.
No. 318,387. Patented May 19, 1885.
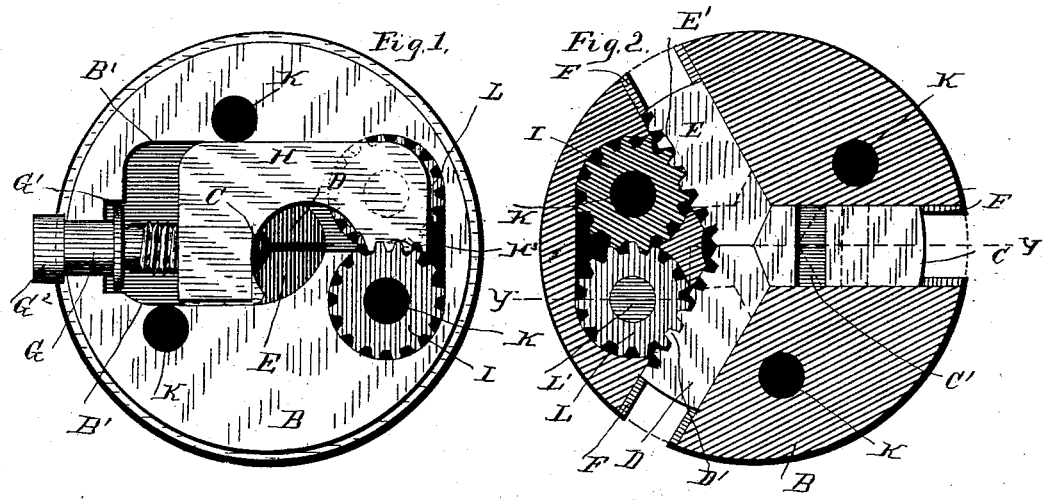
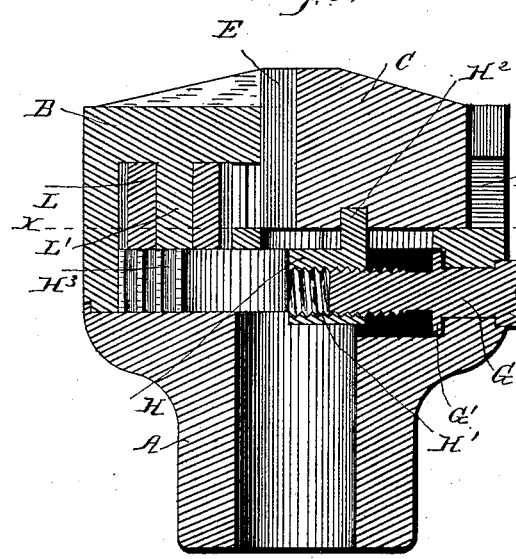
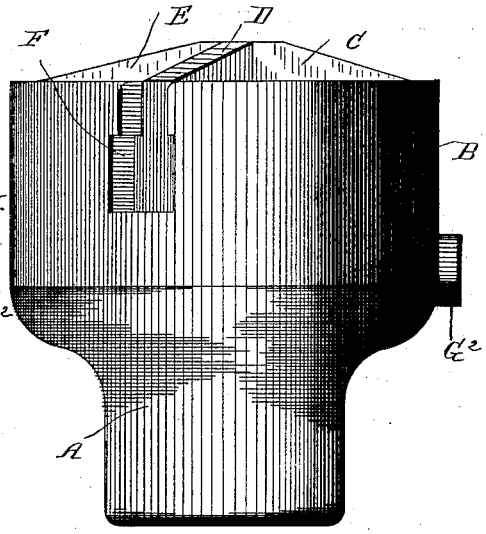
Witnesses.
W. A. Jones,
J. T. Wooster
Inventor.
Samuel T. Newman
By A. M. Wooster
atty.

UNITED STATES PATENT OFFICE.

SAMUEL T. NEWMAN, OF DANBURY, CONNECTICUT.

LATHE-CHUCK.

SPECIFICATION forming part of Letters Patent No. 318,387, dated May 19, 1885.

Application filed October 9, 1884. (No model.)

*To all whom it may concern:*

Be it known that I, SAMUEL T. NEWMAN, a citizen of the United States, residing at Danbury, in the county of Fairfield and State of Connecticut, have invented certain new and useful Improvements in Chucks; and I do hereby declare the following to be a full, clear, and exact description of the invention, such as will enable others skilled in the art to which it appertains to make and use the same.

My invention is applicable to any class of chucks where great strength and holding power are required—as, for instance, in drill and lathe chucks—and has for its object to secure the greatest possible strength and durability, while at the same time the parts shall be few in number and the device simple in construction, easy to operate, and economical in cost.

My invention consists in the construction and combination of parts, as hereinafter fully described, and then pointed out in the claims.

In describing my invention I shall refer by letters to the accompanying drawings, forming part of this specification, in which—

Figure 1 is a plan view of the operative parts, the base of the chuck being removed and the body inverted; Fig. 2, a section on the line $x$ $x$ in Fig. 3, the jaws being in elevation in their closed position, one of the gears also being in elevation; Fig. 3, a section on the line $y$ $y$ in Fig. 2; and Fig. 4, a side elevation of the chuck complete, the jaws being shown in their closed position.

Similar letters indicate like parts in all the figures.

A represents the base, and B the body, of the chuck.

C, D, and E are sliding jaws, which are operated simultaneously, as will be more fully explained.

F represents the ways in which the jaws slide.

G is the operating-screw, which has a flange, G', and head G², which engage with the body and base to hold it against endwise movement.

H is a sliding block, having an internal screw-thread, as at H', with which the operating-screw engages to give it reciprocatory movement in ways B'.

H² is a lug upon the block, which engages a corresponding recess, C', in jaw C, thereby imparting movement thereto.

H³ is a rack upon the sliding block, which meshes with a spur-gear, I. This gear is journaled upon one of the bolts which hold the body and base together when the parts are assembled. These bolts are put in from the face of the chuck in the ordinary manner, for which purpose holes K are provided. Spur-gear I meshes with rack D' upon jaw D, to which it imparts motion, and also meshes with a shorter gear, L, which in turn meshes with rack E' upon jaw E, to which it imparts motion. Gear L is journaled upon a pin, L', which is solid with or screwed into the metal of the body.

The operative parts of this chuck, four in number, besides the jaws, are all contained in the body of the chuck. They are the operating-screw, the sliding block, and the two spur-gears.

I do not of course desire to limit myself to the exact construction shown, as it is apparent that the details may be varied within reasonable limits without departing from the spirit of my invention.

For convenience in illustration I have shown my invention as applied to a three-jaw chuck; but it is obvious that the principle is equally applicable to a two or a four jaw chuck.

The operation is so simple as hardly to require explanation. In use screw G is turned either to the left or right to open or close the jaws, as may be desired. The screw itself imparts motion to the sliding block, which in turn imparts motion by means of a projecting lug to one of the jaws, and by means of a rack upon the block to a spur-gear. The spur-gear in turn meshes with a rack upon a second jaw, to which it imparts motion, and to a second spur-gear, which meshes with a rack upon the third jaw. Thus it will be seen that rotation of the operating-screw in either direction imparts an equal amount of motion to each of the jaws, which must move simultaneously in the same direction, whether they are opened or closed. As the motion is imparted by a screw and transmitted by rack and gears, it must be perfectly positive and unyielding, so that no power that can be brought to bear upon the jaws can move either of them the slightest degree.

Having thus described my invention, I claim—

1. In a chuck, a sliding block having a rack engaging a spur-gear and a lug engaging one of the jaws, in combination with other jaws having racks and operated through spur-gears from the rack on the sliding block.

2. The sliding block and operating-screw, in combination with the spur-gears and the jaws.

3. The sliding block having a lug-engaging jaw, C, and a rack-engaging spur-gear, I, in combination with spur-gear L and jaws having racks which engage the spur-gears.

4. The operating-screw having flange G' and head G², and the sliding block having internal screw-thread engaging said screw, a lug, H', and a rack, H², in combination with the spur-gears and the jaws.

5. The sliding block having lug H² and rack H³, in combination with spur-gear I, engaging said rack, spur-gear L under the sliding block and engaging spur-gear I and the jaws.

6. In a chuck, a sliding block operated by a screw and having a lug and rack, as shown, in combination with the spur-gears and the jaws.

In testimony whereof I affix my signature in presence of two witnesses.

SAMUEL T. NEWMAN.

Witnesses:
LEVI K. MANSFIELD,
IRVING L. SHELDON.